United States Patent [19]

Curtis

[11] 4,363,174
[45] Dec. 14, 1982

[54] GRAVITY ACTUATED GUIDING DEVICE FOR FARM MACHINES

[76] Inventor: Ralph H. Curtis, P.O. Box 132, Princeton, Iowa 52768

[21] Appl. No.: 176,994

[22] Filed: Aug. 11, 1980

[51] Int. Cl.$^3$ .......................................... B62D 15/02
[52] U.S. Cl. .................................. 33/264; 33/185 V; 172/430
[58] Field of Search ................ 172/5, 6, 23, 26, 430; 33/185 R, 185 V, 264, 275 R, 308, 333, 354, 391, 399, 401, 402; 37/DIG. 19; 104/244.1; 180/131; 280/762, 770

[56] References Cited

U.S. PATENT DOCUMENTS

| | | | |
|---|---|---|---|
| 567,539 | 9/1896 | Francisco | 33/399 X |
| 716,725 | 12/1902 | Lee | 172/23 |
| 1,319,249 | 10/1919 | Rummer | 33/401 |
| 1,373,852 | 4/1921 | Allen | 172/430 |
| 2,555,954 | 6/1951 | Bruflat | 33/264 |
| 2,929,457 | 3/1960 | Langerak | 172/430 |
| 3,104,476 | 9/1963 | Hayes | 33/185 R |
| 4,184,551 | 1/1980 | Orthman | 172/26 |

FOREIGN PATENT DOCUMENTS

| | | | |
|---|---|---|---|
| 616874 | 2/1961 | Italy | 33/401 |

Primary Examiner—Richard T. Stouffer
Attorney, Agent, or Firm—Emrich, Lee, Brown & Hill

[57] ABSTRACT

A gravity-actuated guide for row crops which mounts on a tractor front axle to enable the operator to compensate for changes in transverse slope by steering the tractor and thereby correctly position cultivating equipment behind the tractor in relation to the rows.

7 Claims, 5 Drawing Figures

GRAVITY ACTUATED GUIDING DEVICE FOR FARM MACHINES

BACKGROUND AND SUMMARY

1. Technical Field

The present invention relates generally to control devices for cultivators and, more specifically, to a gravity actuated guide for row crops that when mounted on a tractor front axle will enable the operator to compensate for changes in transverse slope by steering the tractor and thereby correctly positioning the cultivating equipment behind the tractor in relation to the rows.

2. Background of Prior Art

Vehicles driven on a sloping terrain will have their rear wheels track lower on the face of the slope than the front wheels. As used herein, the slope refers to the slope of the ground transverse of the direction of travel of the traction vehicle. Normally when using a tractor equipped with cultivating tools, one centers the tractor by aligning the tractor's center with the center of the row of plants being cultivated. Cultivating tools are then properly positioned on either side of the crop row. On sloping terrain, the cultivator, trailing behind the tractor's rear wheels, tracks off center because the tractor's rear wheels are lower on the slope than the front wheels. To properly align the cultivating tools relative to the crop, one must compensate by steering the tractor further up the slope. The degree of such compensation depends on the amount of slope. It requires much experience before one can readily and accurately adjust for changes in slope and even then after a time such work can be fatiguing and marred with error.

Various types of attachments have been proposed for aiding farm machine operators to compensate for variably sloping terrain. Examples of such devices are disclosed in U.S. Pat. Nos. 2,555,954, 2,929,457, 3,104,476 and 1,373,852.

3. Summary of the Invention

The embodiment of the present invention translates the motion of a pendulum member to a second guide arm member by means of a crossbar. The members cooperate in a manner such that the arc of movement of the guide arm is increased relative to the movement of the pendulum movement. The preferred embodiment can be adjusted for particular farm machines and operating conditions. The increased arc of the guide arm and the capability to fine tune the device enables the device to more accurately indicate to the machine operator the degree of compensation required to keep the cultivator tools and crop rows in proper alignment. The guide arm acts as a pointer and indicates where the crop row should be as the farm machine passes over. The operator steers the forwardly moving machine so the crop plants pass under the guide arm calibrated to indicate proper alignment of the cultivator equipment with the crop rows. In its preferred embodiment, the bottom of the guide arm is equipped with a plant gate having a high clearance to aid the operator in following the row of plants, in which case, the operator steers the forwardly moving farm machine in a manner that keeps the plants moving through the gate of the calibrated device mounted on the farm machine to insure proper alignment of the cultivating equipment with the rows of the crop.

Thus, according to the present invention, an extremely simple attachment which can be manufactured at minimum cost, can be readily attached to a conventional farm machine to aid the operator in compensating for changes in sloping terrain. The device can be made adjustable across a wider range to provide accurate readings as to the degree of compensation needed by the operator for a particular tractor and the particular conditions at that time. Other features and advantages of the present invention will be apparent to those skilled in the art from the following detailed description of a preferred embodiment accompanied by the attached drawing wherein identical reference numerals will refer to like parts in the various views.

BRIEF DESCRIPTION OF SEVERAL VIEWS OF DRAWINGS

DETAILED DESCRIPTION

Figure 1:
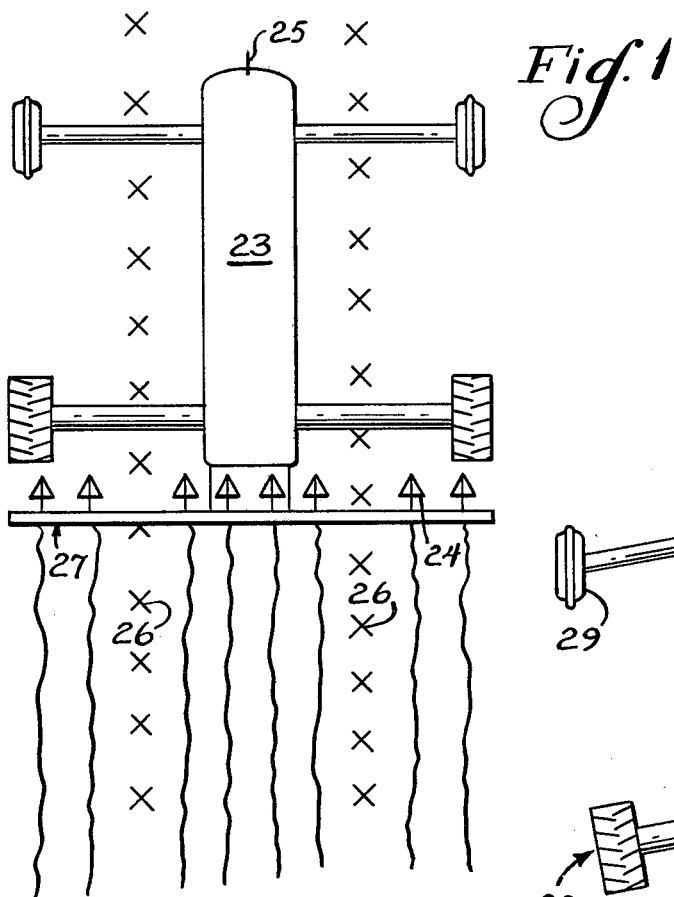
FIG. 1 shows a diagrammatic plan view of a tractor equipped with a cultivator moving through rows of crops on a level terrain.
Figure 2:
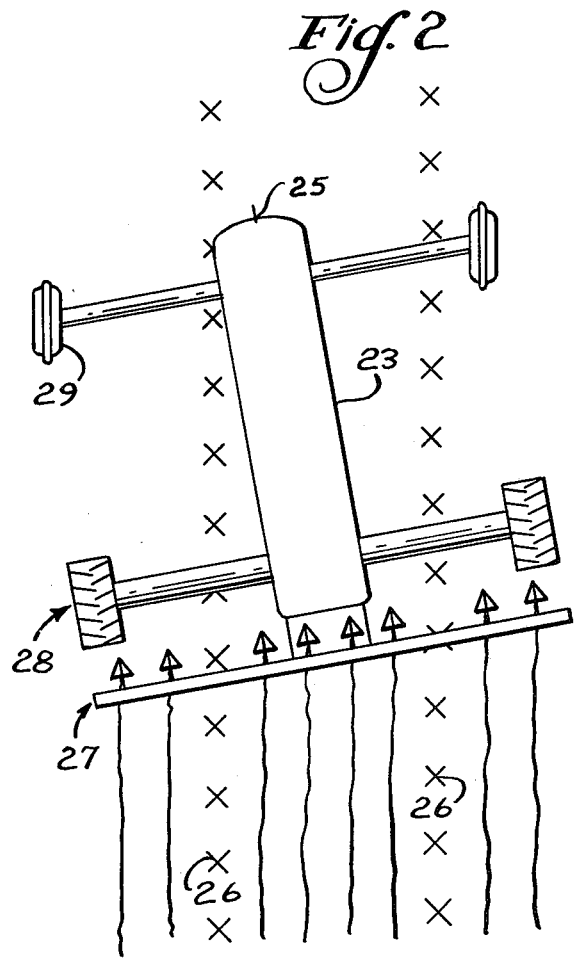
FIG. 2 is a diagrammatic plan view of the same tractor and cultivator moving through rows of crops located on a laterally sloping terrain.

Turning first to FIG. 1, the tractor 23 is equipped with a tool bar 27 with cultivating tools 24. On a level terrain, the operator aligns the cultivating tools 24 with the rows of crops 26 by lining up the center of the tractor with the midpoint between the rows. Referring now to FIG. 2, a tractor 23 traversing a laterally-sloping terrain will have its rear wheels 28 track lower than the front wheels 29. This tendency of the rear wheels of the tractor to track lower on slope increases with the slope and other conditions such as the drag force of the attachments. The tractor operator can no longer line up the center of the tractor with the midpoint between the rows because to do so might damage the crop. In order to prevent damage to the crop, the tractor operator must steer up the slope as shown. The exact amount of compensation needed to prevent cultivating out the rows of plants is difficult to determine and varies with slope. The gravity-actuated guiding device automatically compensates for the slope as long as the operator maintains a predetermined spacing between a row and a gauge means.

Figure 3:
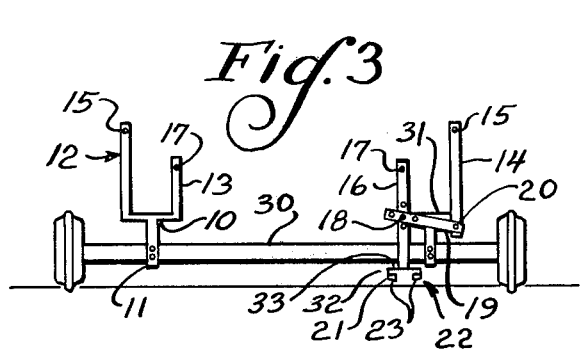
FIG. 3 is a diagrammatic fragmentary front view of a portion of a farm machine showing apparatus incorporating the present invention mounted on the front axle of the farm machine.
Figure 4:
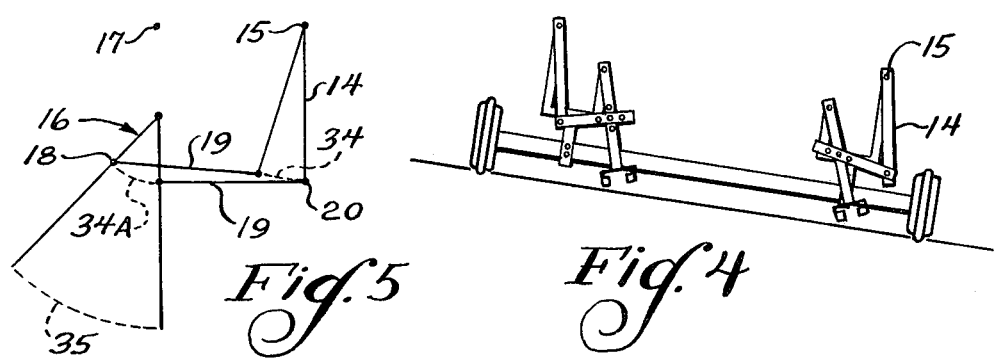
FIG. 4 is a fragmentary front view of a portion of a farm machine shown on sloping ground and illustrating the operation of the apparatus of FIG. 3.

FIG. 3 illustrates a fragmentary and a complete gravity-actuated guide for farm machines 31. A fork-shaped frame 10 is detachably mounted on the forward axle 30 of a farm machine as illustrated on the left side of axle 30. The fork-shaped frame 10 has two extensions forming the fork, one extension being long 12 and the other being short 13. A weighted pendulum member 14 is pivotally mounted on the end of the long extension 12 at point 15. The weighted pendulum member is maintained in a downwardly extended position by the force of gravity. A guide arm 16 is pivotally mounted on the short extension 13 of the frame at point 15. The guide arm 16 extends a distance below the frame 10 in order to place the bottom of the guide arm in close proximity to the plants. A crossbar 19 is pivotally connected at 20 to the end of the weighted member or pendulum 14. The crossbar is also pivotally connected at its other end 18 to the middle area of the guide arm. As can be seen from FIG. 4, as the machine is tilted laterally, said pendulum member 14 will still maintain an upright position and will move in an arc relative to the farm machine.

Figure 5:
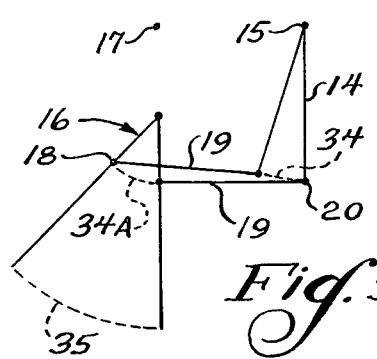
FIG. 5 is a diagrammatic view showing the greater arc of movement of an apparatus incorporating the present invention.

Referring now to FIG. 5, pivot connection 20 moves in an arc 34, and the pivot connection 18 moves in an arc 34A. The radius of arc 34A is smaller than that of arc 34, so that the lateral displacement of pivot 18 is greater than that of pivot 20. The guide arm 16 extends below its connection to the crossbar and, therefore, the gauge means at the bottom of the guide arm has a still greater lateral displacement resulting from movement along arc 35. The displacement of the gauge means 35 for a given movement of the pendulum member 14 can be increased (decreased) by decreasing (increasing) the distance between the guide arm/frame pivot point 17 and the crossbar/guide arm pivot point 18.

The cross arm and the guide member may be equipped with apertures spaced along the length of each member. This permits adjustment in the lateral displacement of the gate for a given arc movement, designated 34, of the pendulum member 14. A corresponding movement of the guide arm 16 may be increased by decreasing the length between the pivot connections 18 and 15.

The device is calibrated by placing the device on the front axle of the tractor at a vertical and horizontal position wherein the bottom of the guide arm which forms a gauge means, is at a predetermined space from the plants to be cultivated. Then, with the farm machine on a laterally sloping surface, the operator will be able to determine the correct position of the tractor with respect to the crop rows and with the tractor in that position (see FIG. 2) the operator can adjust the crossbar and guide arm pivot points at 18 to provide for the correct position of the guide arm to place the gauge means at the predetermined distance to the crop. With the device properly calibrated, it can then be used by visually aligning the gauge means of the guide arm 16 with the top of the plants as the tractor moves down the rows and over sloping terrain. The device will automatically indicate the correct position of the tractor to maintain the position of the cultivating equipment to the crop rows. It will also be noted that the guide unit can be laterally offset with respect to the longitudinal center of the machine so that the machine operator may conveniently watch the location of the guide unit with respect to a particular plant row without being required to look backward to ascertain the location of the cultivator elements with respect to the plant rows.

The device may be equipped with a plant gate 32 attached to the bottom of the guide arm 16. The plant gate preferably includes a horizontal rod 33 positioned parallel to the ground and perpendicular to the direction of movement of the tractor and attached to the bottom of guide arm 16. The rod 33, and hence the entire gate, is free to rotate out of the way if resistance is encountered. At each end of bar 33 is a flap or plate 21 extending downward below the top portion of the plants. The flaps 21 are angled rearwardly towards each other to form a funnel shape with openings fore and aft. Flaps are sufficiently spaced to allow plants to easily pass through the openings between the flaps and flap members. It will be appreciated that the structure of the preferred gate has a high clearance for crops and need not be adjusted for variations in crop height. In practice, the operator would drive the farm machine so that the plants pass through the gate of the calibrated device. Experience has indicated that it is easier to maintain proper alignment of the cultivator shovels with the use of a gate than it is by visually aligning the bottom of the guide arm with the plant tops in the crop rows.

The plant gate is hinged at the point of attachment to the guide arm in order to allow it to swing upward when it strikes a hard object. The hinged plant gate can be balanced on the hinge or equipped with a stop such that its normal resting position is in the downward position. Thus, after the gate is deflected upward, it will return to a normal downwardly extending position.

Having thus described in detail the preferred embodiment, it will be noted that persons skilled in the art will be able to substitute equivalent elements for those that have been disclosed and to modify certain of the structures illustrated while continuing to practice the principle of the invention; and it is, therefore, intended that all of such modifications and substitutions be covered as they are embraced within the spirit and scope of the appended claims.

I claim:

1. A gravity-actuated apparatus for providing a visual guide to an operation of a traction vehicle pulling a cultivator for a row crop, comprising:
    a. a frame adapted to be mounted to the front of a vehicle and defining first and second pivotal connections spaced, laterally from each other in a plane transverse of the direction of travel of said vehicle;
    b. a weighted pendulum member suspended downwardly from said first pivotal connection of said frame for movement relative to said frame to be maintained by gravity in a generally vertical position as the slope of the terrain on which the tractor rides varies;
    c. a guide arm mounted to said second pivotal connection of said frame and including a gauge means for placement at a predetermined spacing relative to said crop to indicate the transverse position of the cultivator relative to the crop; and
    d. a crossbar pivotally connected to a third connection to said weighted pendulum member and pivotally connected at a fourth connection to said guide arm with said guide arm extending below said fourth connection and below said weighted pendulum member, said crossbar responding to movement of said pendulum member as the slope of the terrain varies to move said guide arm, said crossbar, guide arm, and weighted pendulum member being so connected to each other that the arc of movement of the guide arm is increased relative to the arc of movement of the pendulum member, thereby varying the displacement of said gauge means relative to the vertical position a predetermined amount which amount is a function of slope of the terrain on which the tractor is riding.

2. The apparatus of claim 1 wherein said gauge means comprises a gate carried by said guide arm and including an upper horizontal rod generally parallel to the ground and perpendicular to the direction of motion of the farm machine; and a pair of flap members extending downwardly of said rod and spaced to allow plants to pass between the flap members.

3. The apparatus of claim 2 wherein said rod of said gate is rotatably mounted to said guide arm.

4. The apparatus of claim 1 wherein said guide arm includes a plurality of spaced apertures whereby said fourth pivot connection may be varied along the length of said guide arm.

5. The apparatus of claim 4 wherein said crossbar includes a plurality of longitudinally spaced apertures whereby the distance between said third and fourth pivot connections may be adjusted.

6. The apparatus of claim 1 characterized in that the distance between said first and third pivotal connections is greater than the distance between said second and fourth pivotal connections.

7. A gravity actuated apparatus for providing a visual guide to an operation of a traction vehicle pulling a cultivator for a row crop, comprising:
   a. a frame adapted to be mounted to the front of a vehicle and defining first and second pivotal connections spaced laterally from each other in a plane transverse of the direction of travel of said vehicle;
   b. a weighted pendulum member suspended downwardly from said first pivotal connection of said frame for movement relative to said frame to be maintained by gravity in a generally vertical position as the slope of the terrain on which the tractor rides varies;
   c. gauge means extending below said pendulum member; and
   d. a mechanism for locating said gauge means at a predetermined spacing relative to the crop, and being linked to said pendulum member to respond to the movement of said pendulum member as the slope of the terrain varies, said mechanism, gauge means, and weighted pendulum member being so linked to each other that the arc of movement of the gauge means is increased relative to the arc of movement of the pendulum member for increasing the displacement of said gauge means beyond the vertical and in the direction of sloping terrain to compensate for the tendency of the rear of the vehicle to slide downhill with increasing slope, whereby said gauge means indicates the transverse position of the cultivator relative to the crop.

* * * * *